(12) United States Patent
Afek et al.

(10) Patent No.: US 11,397,813 B2
(45) Date of Patent: Jul. 26, 2022

(54) SYSTEM AND METHOD FOR VERIFYING A REGEX GROUP

(71) Applicant: HCL TECHNOLOGIES LIMITED, Hertzelia (IL)

(72) Inventors: Jonathan Afek, Kfar Saba (IL); Gal Ben-Yair, Givaat Shmuel (IL)

(73) Assignee: HCL TECHNOLOGIES LIMITED, Hertzelia (IL)

( * ) Notice: Subject to any disclaimer, the term of this patent is extended or adjusted under 35 U.S.C. 154(b) by 340 days.

(21) Appl. No.: 16/870,175

(22) Filed: May 8, 2020

(65) Prior Publication Data

US 2021/0350000 A1 Nov. 11, 2021

(51) Int. Cl.
*G06F 21/56* (2013.01)

(52) U.S. Cl.
CPC ...... *G06F 21/568* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,769,696 B2 | 7/2014 | Pistoia et al. | |
| 8,898,776 B2 | 11/2014 | Molnar et al. | |
| 10,693,901 B1 * | 6/2020 | Chan | H04L 67/02 |
| 2008/0034424 A1 * | 2/2008 | Overcash | H04L 63/1416 726/22 |
| 2013/0091578 A1 * | 4/2013 | Bisht | G06F 21/53 726/25 |
| 2015/0095893 A1 | 4/2015 | Tripp et al. | |
| 2016/0337400 A1 * | 11/2016 | Gupta | G06F 16/2455 |
| 2019/0132350 A1 * | 5/2019 | Smith | G06F 21/577 |

OTHER PUBLICATIONS

Hidhaya et al, Intrusion Protection against SQL Injection Attacks Using a Reverse Proxy (Year: 2012).*
Scholte et al, Preventing Input Validation Vulnerabilities in Web Applications through Automated Type Analysis (Year: 2012).*

* cited by examiner

*Primary Examiner* — Richard A McCoy
(74) *Attorney, Agent, or Firm* — Kendal Sheets

(57) ABSTRACT

Disclosed is a method and system for verifying a regex group. The method comprises verifying of a regex group by creating a flow id through a processor for the regex group when source reaches the sink. The flow id is used for tracking the flow of the regex group. The processor checks in case the flow id is a previously tested flow id. When the flow id is not the previously tested flow id, the processor passes one or more run tasks through a processor forming a queue. The processor tests for one or more vulnerabilities to be associated with the regex group based on the passing, wherein the testing is used to qualify the regex group as a valid regex group.

20 Claims, 12 Drawing Sheets

SYSTEM AND METHOD FOR VERIFYING A REGEX GROUP

CROSS-REFERENCE TO RELATED APPLICATIONS AND PRIORITY

The present application does not claim priority from any patent application.

TECHNICAL FIELD

The present subject matter described herein, in general, relates to data sanitizers and validators, and more particularly to a system method for verifying a regex group for an application testing process.

BACKGROUND

Data received by a software component from a source outside the component's trust boundary may be malicious and may also result in an injection attack. Programmer must take steps to ensure that data received across a trust boundary is appropriate and not malicious. In an exemplary scenario, when an attacker targets a web site, the attacker often attempts to inject data in an attempt to damage the website or gain internal information. Such injections to the web site may be easily parsed through server-side code and, as a result, the website may get corrupted and unintended behaviour may also occur.

In order to avoid such a scenario, it's important to ensure that input data received from a user is properly sanitized before use. In order to check that the data input is not malicious, an input validator and sanitizer have been widely used so far. To protect against such attacks, web site developers may try to sanitize and/or validate incoming input from the user to ensure that no malicious input exists.

A common method of validating tainted input and sanitizing is by using regex to check whether string received as the data input contains tainted characters, in which case an error message is outputted, or whether there are no tainted characters, in which case the code executes normally. However, the method of sanitization and validation is generally flawed so that if the web site developer passes the tainted input through at least one of a regex validator and sanitizer, the input may be assumed to be not tainted but that is not always the case.

SUMMARY

Before the present system and method to verify a regex group in an application testing process are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

This summary is provided to introduce aspects related to a system and a method to verify a regex group in an application testing process. This summary is not intended to identify essential features of the claimed system and method to verify a regex group. The subject matter nor is it intended for use in determining or limiting the scope of the claimed subject matter.

In one implementation, a system to verify a regex group in an application testing process is disclosed. In one aspect, the system comprises a memory, and a processor coupled to the memory. Further, the processor may be capable of executing instructions in the memory to perform one or more steps described now. The processor may create a flow id for a regex group when source reaches the sink. The flow id is used for tracking the flow of the regex group in the testing process. The regex group comprises each of a regex sanitizer and a regex validator. The processor checks if in case the flow id is a previously tested flow id. If in case the flow id is not a previously tested flow id, the processor is configured for passing one or more run tasks in a queue through the regex group. The processor is configured to test for one or more vulnerabilities to be associated with the regex group based on the passing. The testing is used to qualify the regex group as a valid regex group.

In another implementation, a method to verify a regex group in an application testing process is disclosed. The method comprises creating a flow id through a processor for the regex group when source reaches the sink. The flow id is used for tracking the flow of the regex group and the regex group comprises a regex sanitizer and a regex validator. Further checking is done through the processor to check in case the flow id is a previously tested flow id. Further in case the flow id is not the previously tested flow id, one or more run tasks are passed through the regex group in a queue. The regex group is tested for one or more vulnerabilities to be associated with the regex group based on the passing. The testing is used to qualify the regex group as a valid regex group.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for verifying a regex group, similar or equivalent to those described herein can be used in the practice or testing of embodiments of the present disclosure, the exemplary, verifying a regex group are now described. The disclosed embodiments verifying a regex group are merely examples of the disclosure, which may be embodied in various forms.

Various modifications to the embodiment will be readily apparent to those skilled in the art and the generic principles herein may be applied to other embodiments for verifying a regex group. However, one of ordinary skill in the art will readily recognize that the present disclosure for verifying a regex group is not intended to be limited to the embodiments described, but is to be accorded the widest scope consistent with the principles and features described herein.

Generally, a vulnerability in the code occurs when server reads user input from source and proceeds to using the code by sending the code to a sink. If the code developer passes tainted input through a regex sanitizer, the output from the sanitizer or a validator is assumed to be sanitized and validated by the developer; however, the output may not be a sanitized output. The tainted input refers to strings that an attacker may use to try to attack a web site. Conventional systems may detect that the regex sanitizer was called on a tainted source. However, the proposed system and method suggest a way to verify whether a regex group correctly defines a flow that can validate and sanitize user input.

The present subject matter overcomes a problem of a faulty output. The faulty output refers to an output that may not be a sanitized output or validated output. The present system verifies the regex group thereby verifying the flow for validating the user input. The present system verifies or disqualifies the regex group for any possible vulnerability type including Cross-site scripting, SQL injection, command injection or alike.

Figure 1:
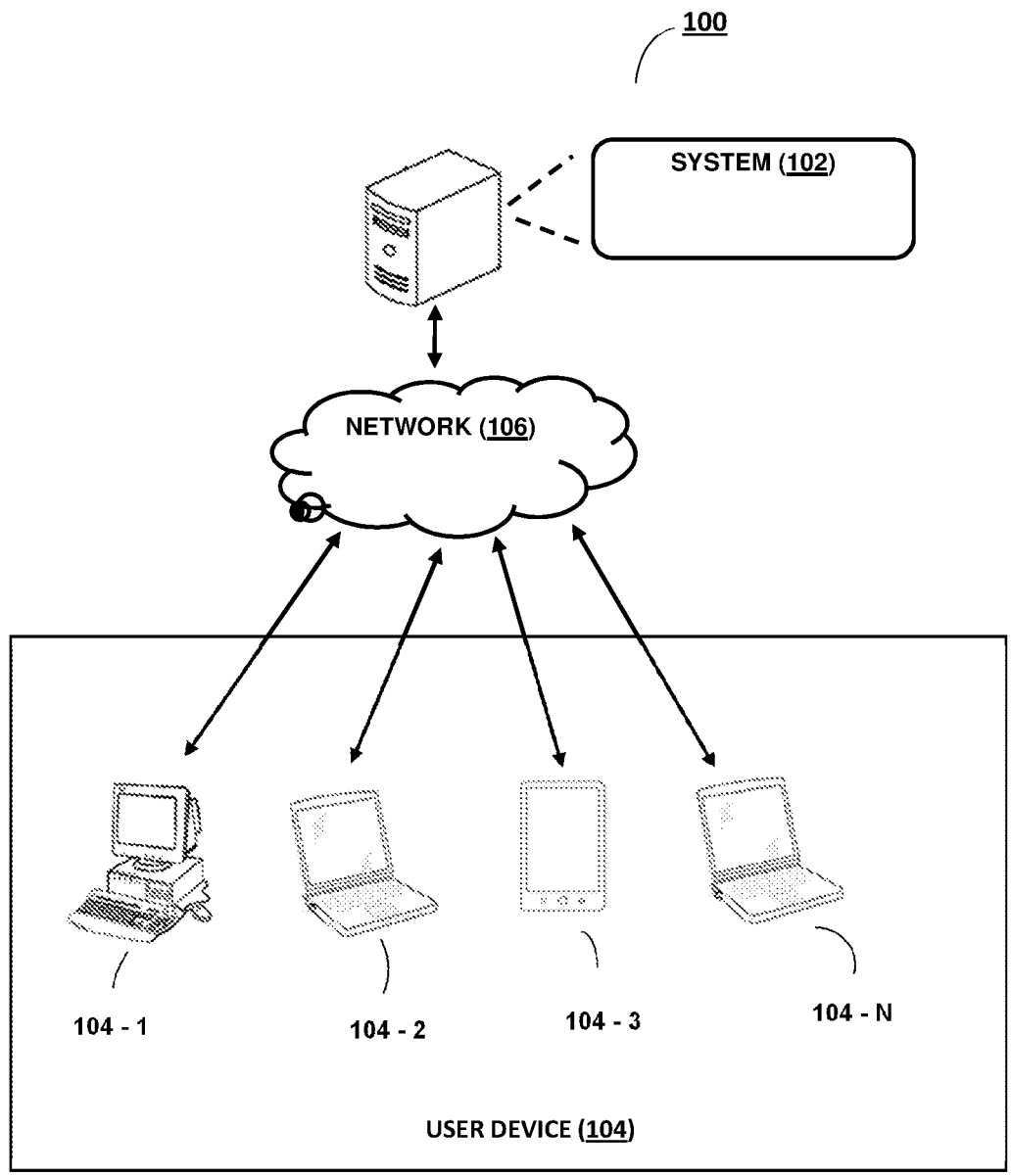
FIG. 1 illustrates a system architecture diagram 100 of a system 102 for verifying a regex group, in accordance with an embodiment of the present subject matter.

Referring now to FIG. 1, a system architecture diagram 100 of a system 102 for verifying a regex group, in accordance with an embodiment of the present subject matter may be described. In one example, the system 102 may be connected with mobile devices 104-1 through 104-N (collectively referred as 104) through a communication network 106.

It should be understood that the system 102 and the mobile devices 104 correspond to computing devices. It may be understood that the system 102 may also be implemented in a variety of computing systems, such as a laptop computer, a desktop computer, a notebook, a workstation, a mainframe computer, a server, a network server, a cloud-based computing environment, or a smart phone and the like. It may be understood that the mobile devices 104 may correspond to a variety of a variety of portable computing devices, such as a laptop computer, a desktop computer, a notebook, a smart phone, a tablet, a phablet, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Figure 2:
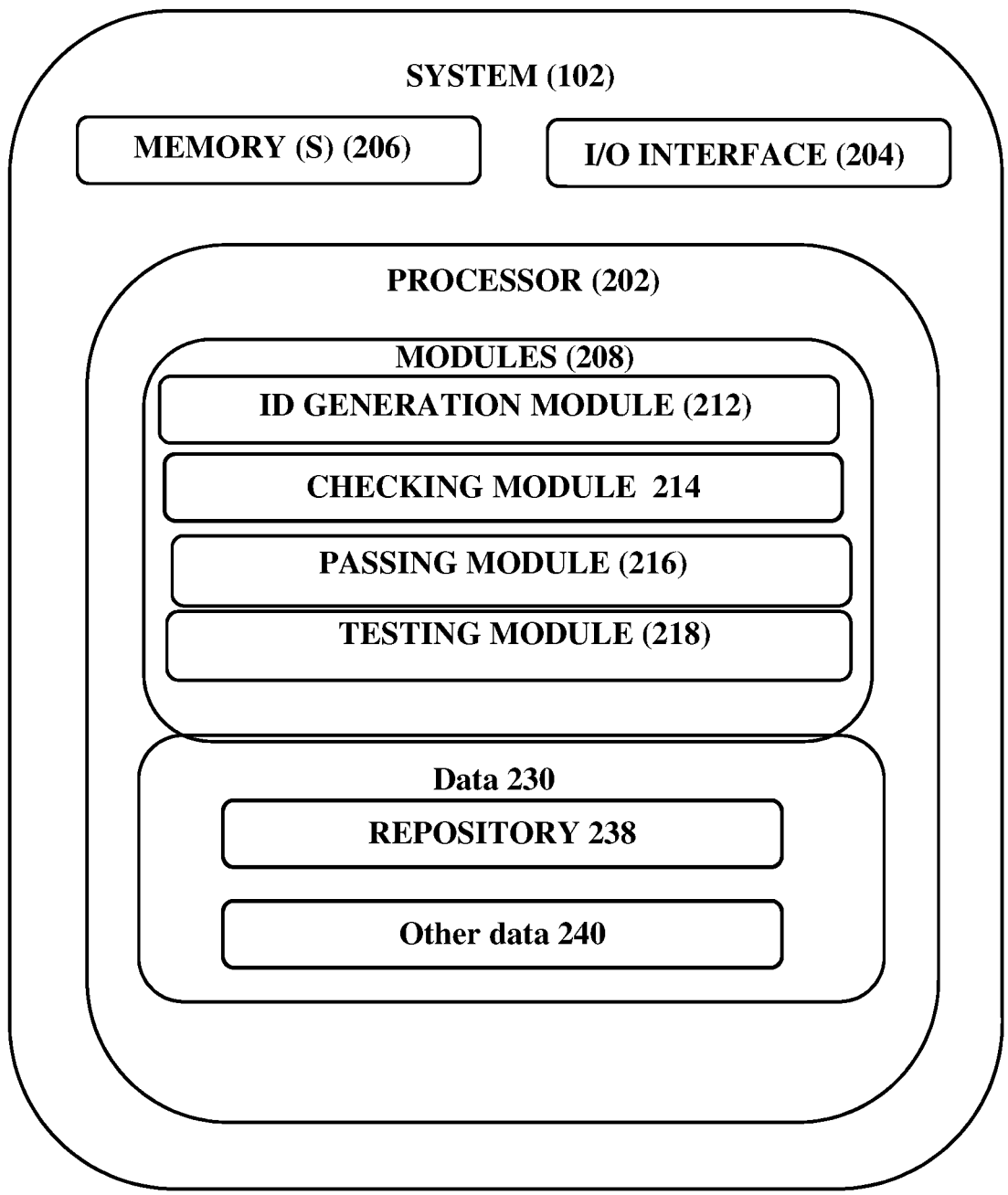
FIG. 2 illustrates a block level diagram of the system 102, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the mobile devices 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. The memory 206 is connected to a plurality of modules 208. The system 102 comprises an id generation module 212, a checking module 214, a passing 216, a testing module 218.

The data 230 may include a repository 238 for storing data processed, computed, received, and generated by one or more of the modules 208. Furthermore, the data 210 may include other data 240 for storing data generated as a result of the execution of modules than the ones mentioned above.

In one implementation, the system is configured to verify a regex group in an application testing process. The processor 202 may create a flow id through the id generation module 212 for the regex group when source reaches the sink. The flow id refers to a hash of various tasks that create the regex group. Task here refers to at least one of a task of the sanitizer and a task of the validator The hash of the flow id is then marked as verified flow id or non verified flow id. If in case the verified hash of the flow id may have been created, a programmer may know that the group has passed or failed during a previous verification process. The flow id is used for tracking the flow of the regex group. The regex group comprises a regex sanitizer and a regex validator. The regex sanitizer may comprise a verified regex sanitizer or a non-verified regex sanitizer and the regex validator may comprise of a verified validator or a non-verified validator.

The processor 202 may further check if in case the flow id created is a previously tested flow id through the checking module 214. Upon checking, if in case the flow id is not a previously checked flow id, then the processor 202 through the passing module 216 may pass one or more run tasks in a queue through the regex group. Tasks refers to the task of the validator. In an exemplary scenario, if user input passes 2 validators, followed by 2 sanitizers followed by one validator, then processor 202 has used 5 tasks in above described order in which the validators and sanitizers are being used.

Further, based upon the passing, the processor 202 may test through the testing module 218 the regex group for one or more vulnerabilities that may be associated with the regex group. The one or more vulnerability type includes Cross-site scripting, SQL injection, command injection or alike. The processor 202 uses testing of the regex group to qualify the regex group as a valid regex group. The regex group is qualified as the valid regex group by the processor 202 in case the flow id is the previously tested flow id. The regex group is disqualified and declared as the non-valid regex group in case an output obtained after passing is a tainted output.

In one embodiment, after the regex group is qualified as one of the valid regex group or the invalid regex group, the flow id for each of the regex group may be stored in a repository 238 as the previously tested flow id. The previously tested flow id may be used for testing a new flow id based on a mapping of the new flow id with the previously tested flow id. The flow id may comprise flow information.

The flow information comprises one or more run tasks. The one or more run tasks comprises each of a code run and type of regex used for validating input of a user. Run tasks are tasks that refers to task of the sanitizer and task of the validator. The one or more run tasks may be associated with the predefined tainted input from payload bank. For example predefined tainted inputs may be ">'<script>alert(1)</script>" or "%2522%253E%2527%253E%253Cscript%2520%253Ealert%25281%2529%253B%253C%252 Fscript%2520%253E" or alike are predefined tainted inputs. The predefined tainted inputs are passed through the regex group for verifying the validity of the regex group.

In another embodiment, the processor 202 may run an original regex sanitizer against a user input for verifying the regex sanitizer in the regex group. An original regex sanitizer is any regex that replaces one text with another based on the sanitizer. For example, an original regex is a regex that replaces all ">" with ">". The user input may be any text at all such as "foo", "bar", "hello", "Steve Jobs", or alike.

Further, the processor 202 may pass output of the running to a subsequent task. For an example, a code may be configured to call for each of the 2 sanitizers (first sanitizer and second sanitizer), 2 (first validator and second validator) validators and 1 more sanitizer. So, the first task may correspond to the first sanitizer. A payload considered malicious is taken and is passed through the first sanitizer. The output obtained from the first sanitizer is then passed through the second sanitizer. Further the output of the second sanitizer is passed through the first validator. In case if the response for passing through the first validator is equal to the output when the input is directly passed through the first validator, then the processor 202 continues the passing. In case if the response for passing through the first validator is not equal to the direct passing of the validator by the original input, then the passing is stopped. The outputs of the previous tasks are passed into the next task until all tasks have been run. If the output is still a malicious output, then the regex group is disqualified. If the output for each of the pass is non-malicious, then the regex group is qualified to be the verified valid regex group In another embodiment, the processor 202 may run an original regex sanitizer against the user input for obtaining a Boolean return value. For example, the user input comprises "<input>". The validator checks if in case the input contains the character "<". The result is "true" because the user input contains the character "<". The true result user input refers to the original return value. When a task is run to mimic the validator, a malicious input is passed in, for example, "%27%22%3E%3Cscript%3Ealert%281%29%3 C%2Fscript%3E". In this case, the task returns false because as there is no "<" in the malicious string. Because of such return false, checking of the validator with the subsequent input is discontinued. In another exemplary scenario, if the input is ">'><script>alert(1)</script>", then the output received is true and the testing of the validator is continued.

Further, the processor 202 may check if in case the Boolean return value is equal to an original return value. In case the Boolean return value is equal to the original return value, the processor 202 continues with a subsequent task.

In another embodiment, the processor 202 may run an original regex sanitizer against the user input for obtaining the Boolean return value. Further the processor 202 may check if in case the Boolean return value is not equal to the original return value. In case the Boolean return value is not equal to the original return value, then the processor 202 pauses the checking. The processor 202 further runs a next user input. The regex validator is considered as a verified regex validator in case the next user input is last user input and returns the original value. The next user input refers to any kind of text input.

Referring now to FIG. 3, a method 300 of verifying the regex group is described, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 of verifying the regex group is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the flow id is created by the processor 202 through the id generation module 212. the flow id for each of the regex group may be stored in the repository 238 as the previously tested flow id. The previously tested flow id may be used for testing the new flow id based on the mapping of the new flow id with the previously tested flow id. The flow id may comprise flow information.

At block 304, checking is done through the processor 202 through the checking module 214. The checking module 214 checks if in case the flow id is the previously tested flow id.

At block 306, if in case the flow id is not the previously tested flow id, then passing of the one or more run tasks in the queue through the regex group is performed, by the processor 202 through the passing module 216. The flow information comprises one or more run tasks, and the one or more run tasks comprises each of a code run and type of regex used for validating input of a user. Run tasks refers to at least one of the task of the sanitizer and the task of the validator. The one or more run tasks may be associated with the predefined tainted input from payload bank.

At block 308, after the passing is performed in block 306, the testing of the one or more vulnerabilities associated with the regex group is further tested by the processor 202. The testing is used to qualify the regex group as the valid regex group. The regex group is qualified as the valid regex group by the processor 202 in case the flow id is the previously tested flow id. The regex group is disqualified as the valid regex group in case an output obtained after passing is the tainted output.

Figure 3A:
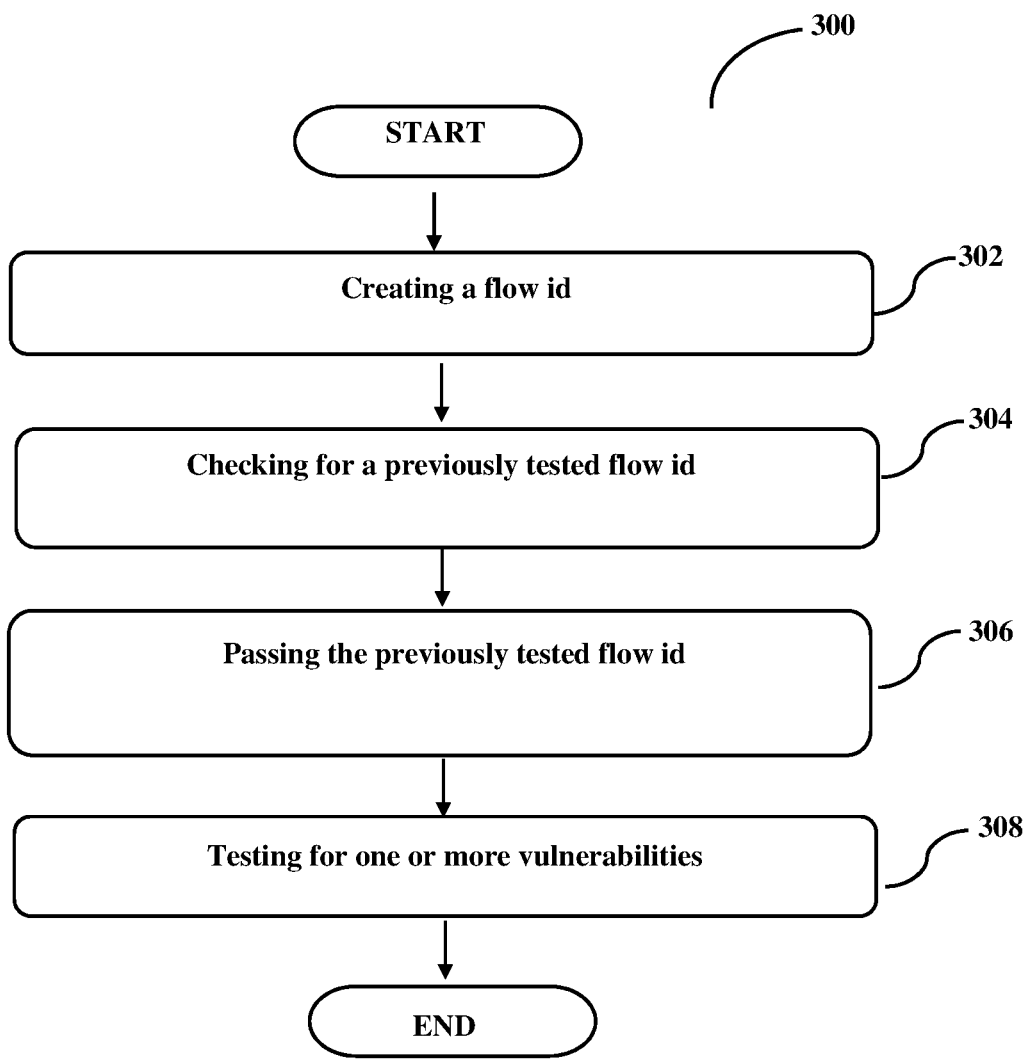
FIG. 3A illustrates a method 300 for verifying a regex group, in accordance with an embodiment of the present subject matter.
Figure 3B:
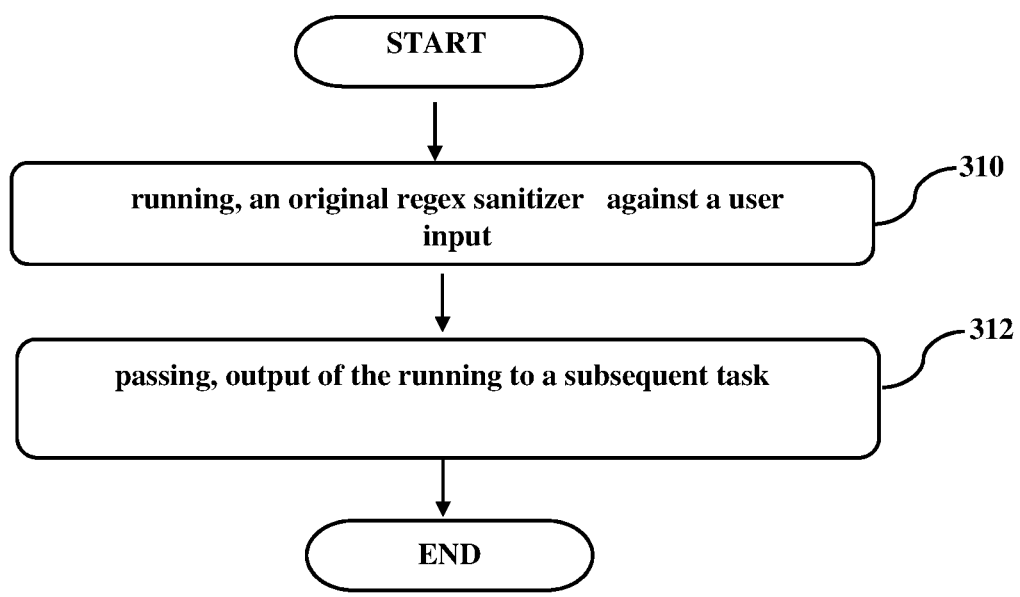
FIG. 3B illustrates an embodiment of a method 300 for verifying a regex group, in accordance with an embodiment of the present subject matter.

Referring now to FIG. 3B, In an embodiment additionally the method 300 of verifying the regex group may check if the flow id is not the previously tested flow id. If the flow id is not the previously tested flow id, then passing of the one or more run tasks in the queue through the regex group is performed, by the processor 202 through the passing module 216. Passing of the flow id may further comprise of the following steps:

At block 310, the processor 202 then runs the original regex sanitizer against the user input for verifying the regex sanitizer in the regex group. An original regex sanitizer comprises a regex sanitizer that replaces one text with another based on the sanitizer. Example of the user input comprises absolute any text at all such as "foo", "bar", "hello", "Steve Jobs", or alike.

At block 312, the processor 202 then passes the output of the running to the subsequent task.

Figure 3C:
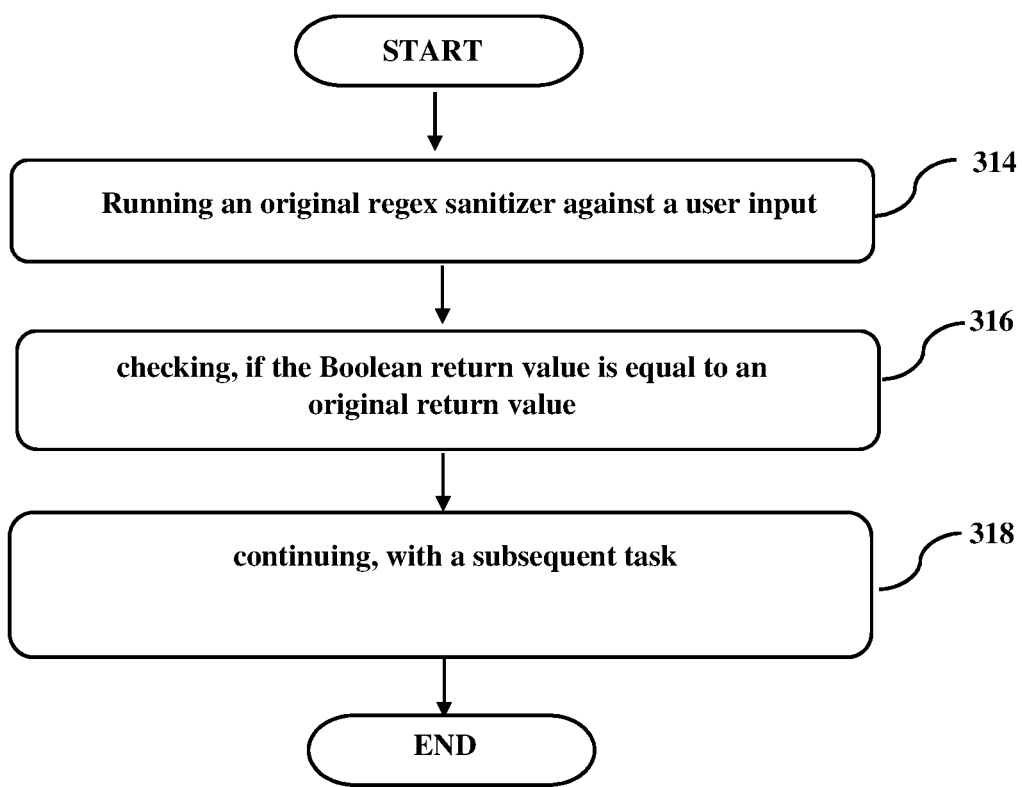
FIG. 3C illustrates an embodiment of a method 300 for verifying a regex group, in accordance with an embodiment of the present subject matter.

Referring now to FIG. 3C, in another embodiment, additionally the method 300 to verify a regex group, may check if the flow id is not the previously tested flow id. If the flow id is not the previously tested flow id. then passing of the one or more run tasks in the queue through the regex group is performed, by the processor 202 through the passing module 216. Passing of the flow id may further comprise of the following steps:

At block 314 the processor 202 runs the original regex sanitizer against the user input for obtaining the Boolean return value for verifying the regex validator.

At block 316, the processor 202 checks in case the Boolean return value is equal to the original return value.

At block 318, in case the Boolean return value is equal to the original return value, the processor continues with the subsequent task.

Figure 3D:
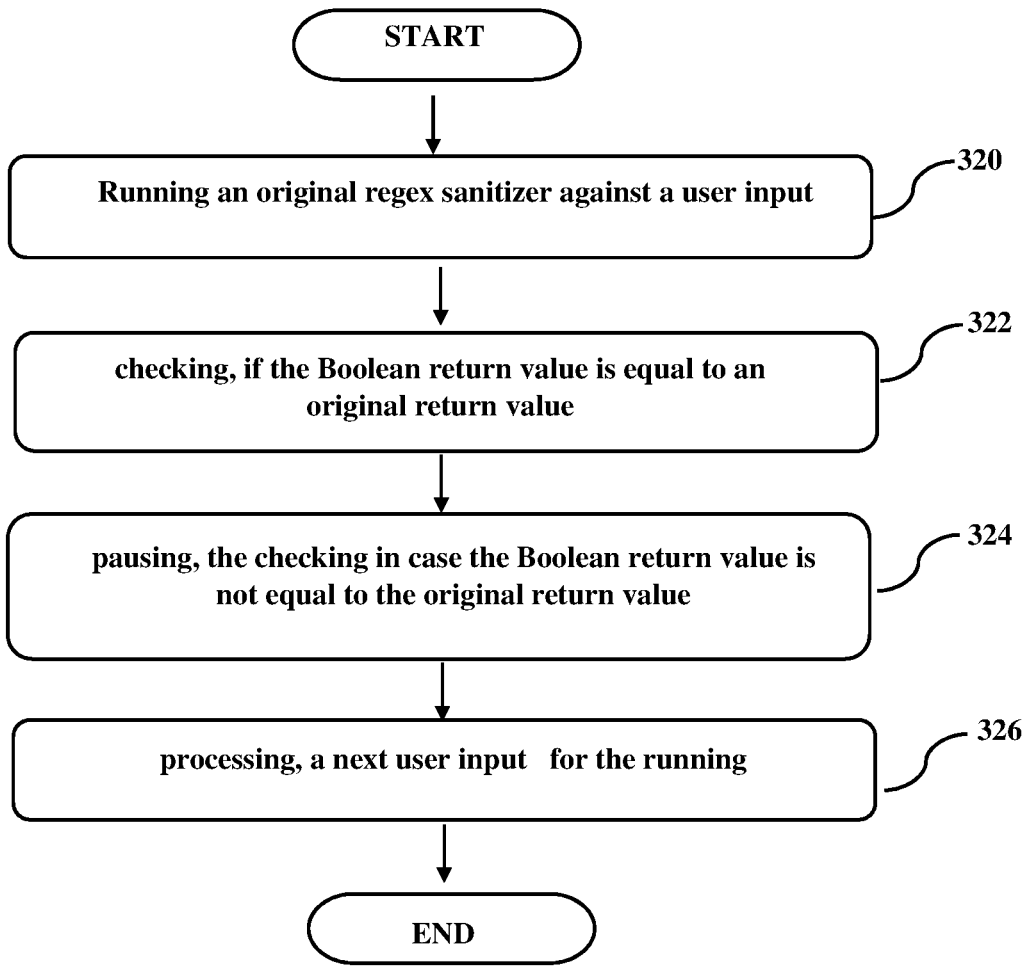
FIG. 3D illustrates an embodiment of a method 300 for verifying a regex group, in accordance with an embodiment of the present subject matter.

Referring to FIG. 3D, in another embodiment, additionally the method 300 to verify a regex group, may check if the flow id is not the previously tested flow id. If the flow id is not the previously tested flow id. then passing of the one or more run tasks in the queue through the regex group is performed, by the processor 202 through the passing module 216. Passing of the flow id may further comprise of the following steps: At block 320, the processor 202 runs the original regex sanitizer against the user input for obtaining the Boolean return value for verifying the regex validator.

At block 322, the processor 202 checks if the Boolean return value is not equal to the original return value.

At block 324, if in case the Boolean return value is not equal to the original return value, the processor 202 pauses the checking.

At block 326, the processor 202 after pausing the checking processes the next user input that is in queue for running the at least one of a regex sanitizer and a validator against the user input. The regex validator is considered as the verified regex validator in case the next user input is the last user input.

Figure 4A:
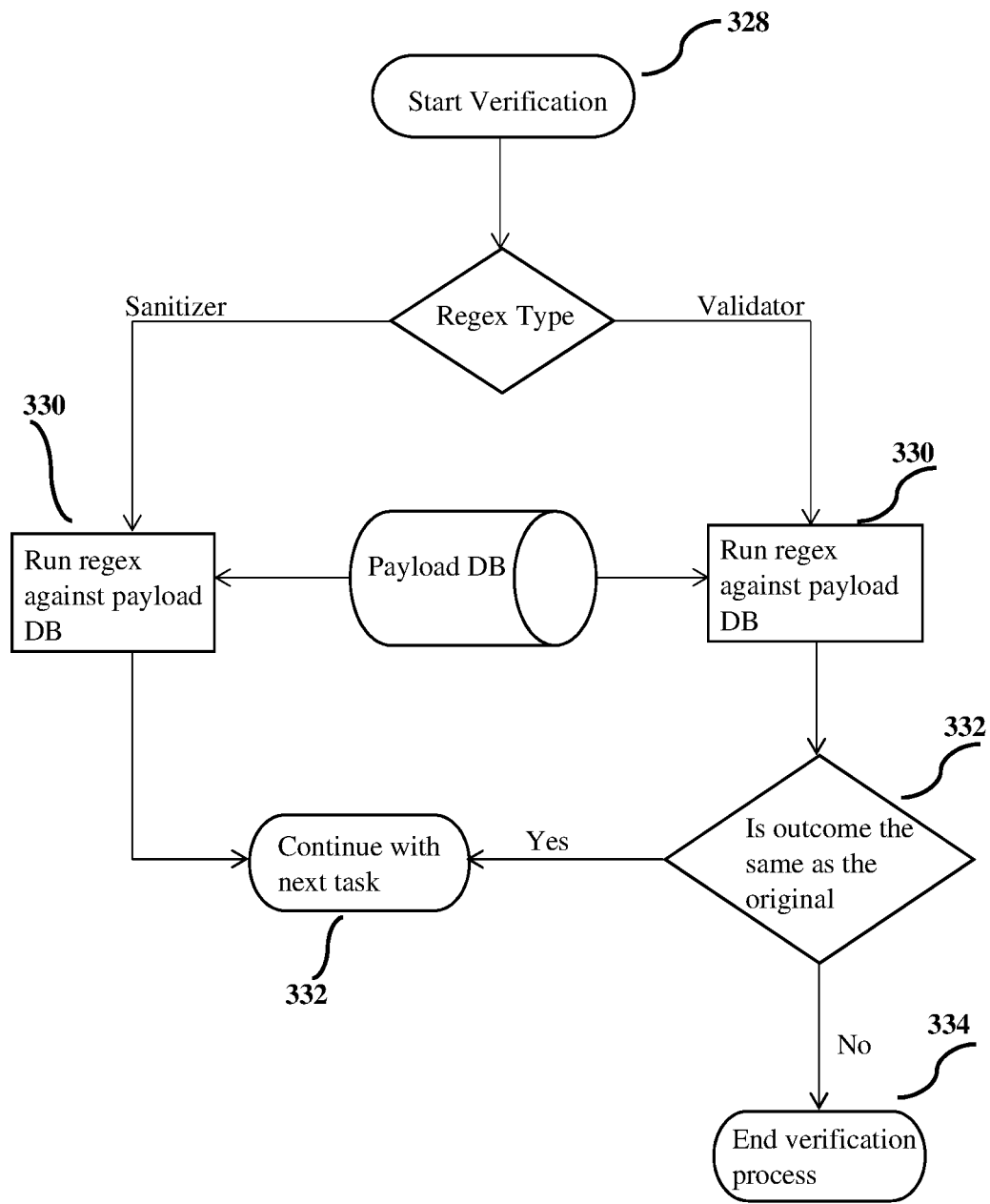
FIG. 4A illustrates a working flowchart of the method 300 for verifying a regex group, in accordance with an embodiment of the present subject matter.

Referring now to FIG. 4A, an example embodiment of additional details of the method 300 providing verification of the regex group is described.

In an example implementation, at step 328, the verification of the regex group is started.

In step 330 firstly the processor 202 runs the original regex sanitizer and validator against the user input for obtaining the Boolean return value to verify the regex sanitizer and validator. The processor 202 checks if the Boolean return value is equal to the original return value.

In step 332, in case of regex validator, if the Boolean return value is equal to the original return value, then the processor 202 continues with the subsequent task to be run as the next task.

In step 334, if in case the Boolean return value is not equal to the original return value, the processor 202 stops the verification process.

Figure 4B:
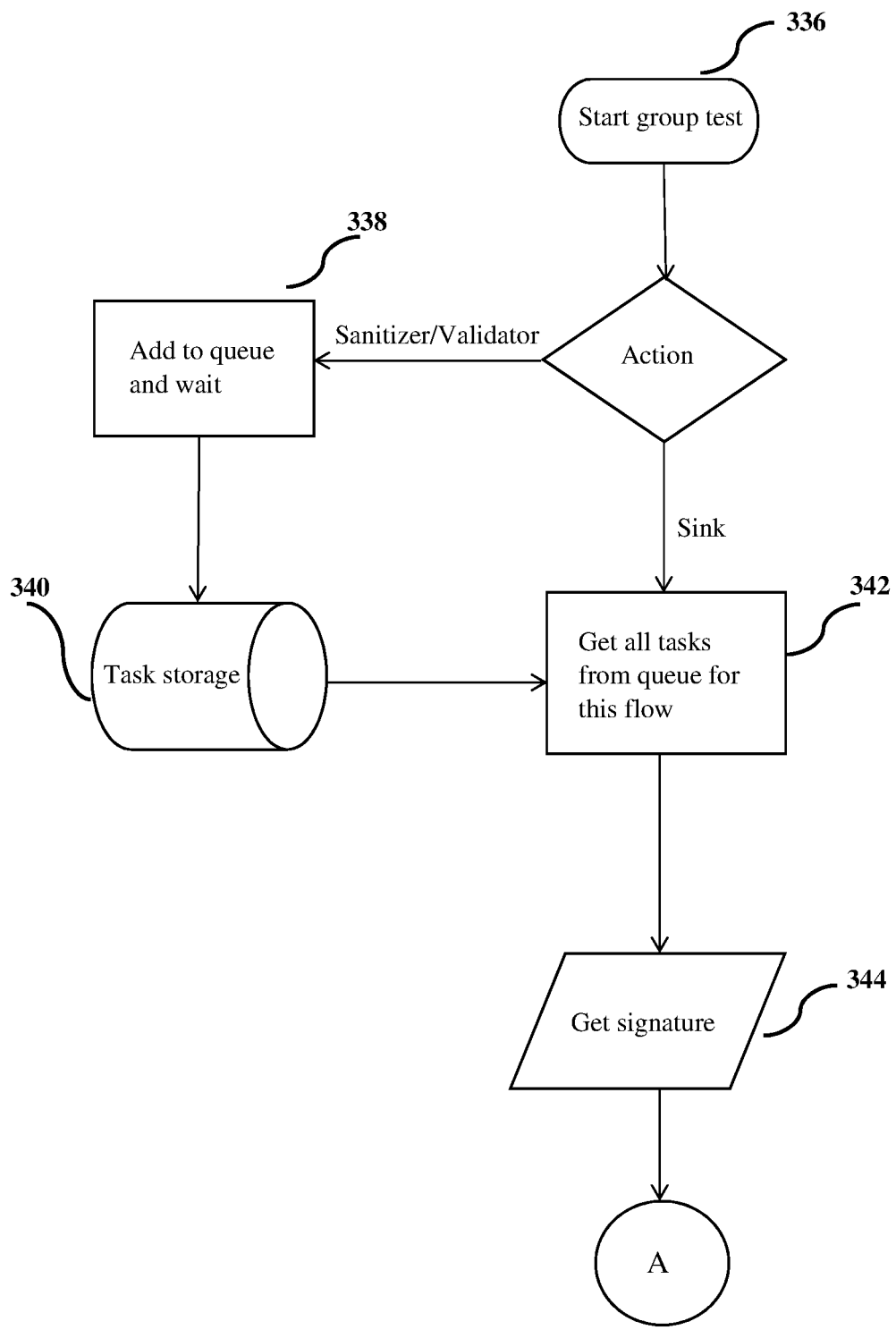
FIGS. 4B-4D illustrate a working flowchart of the method 300 for verifying a regex group, in accordance with an embodiment of the present subject matter.
Figure 4C:
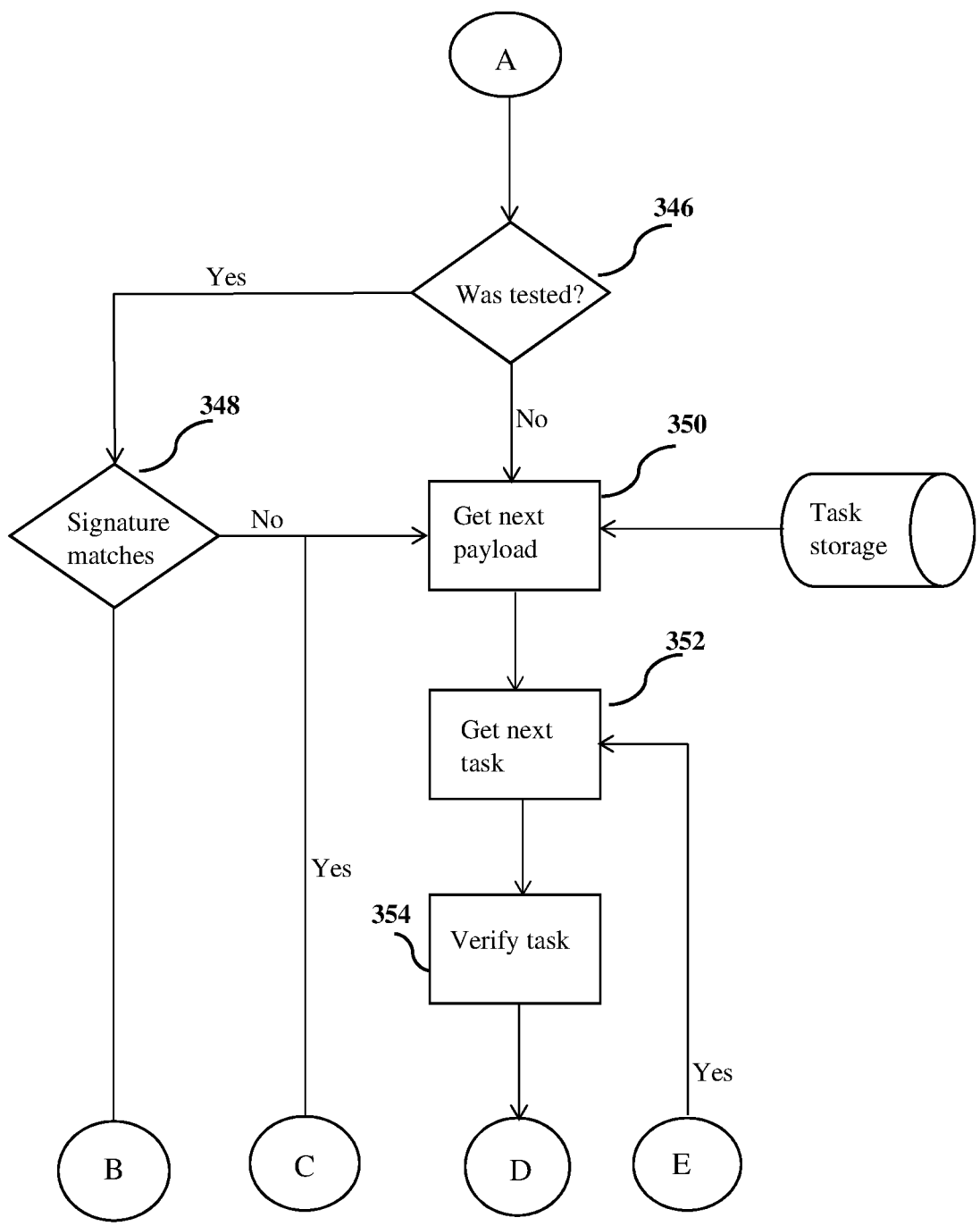
Figure 4D:
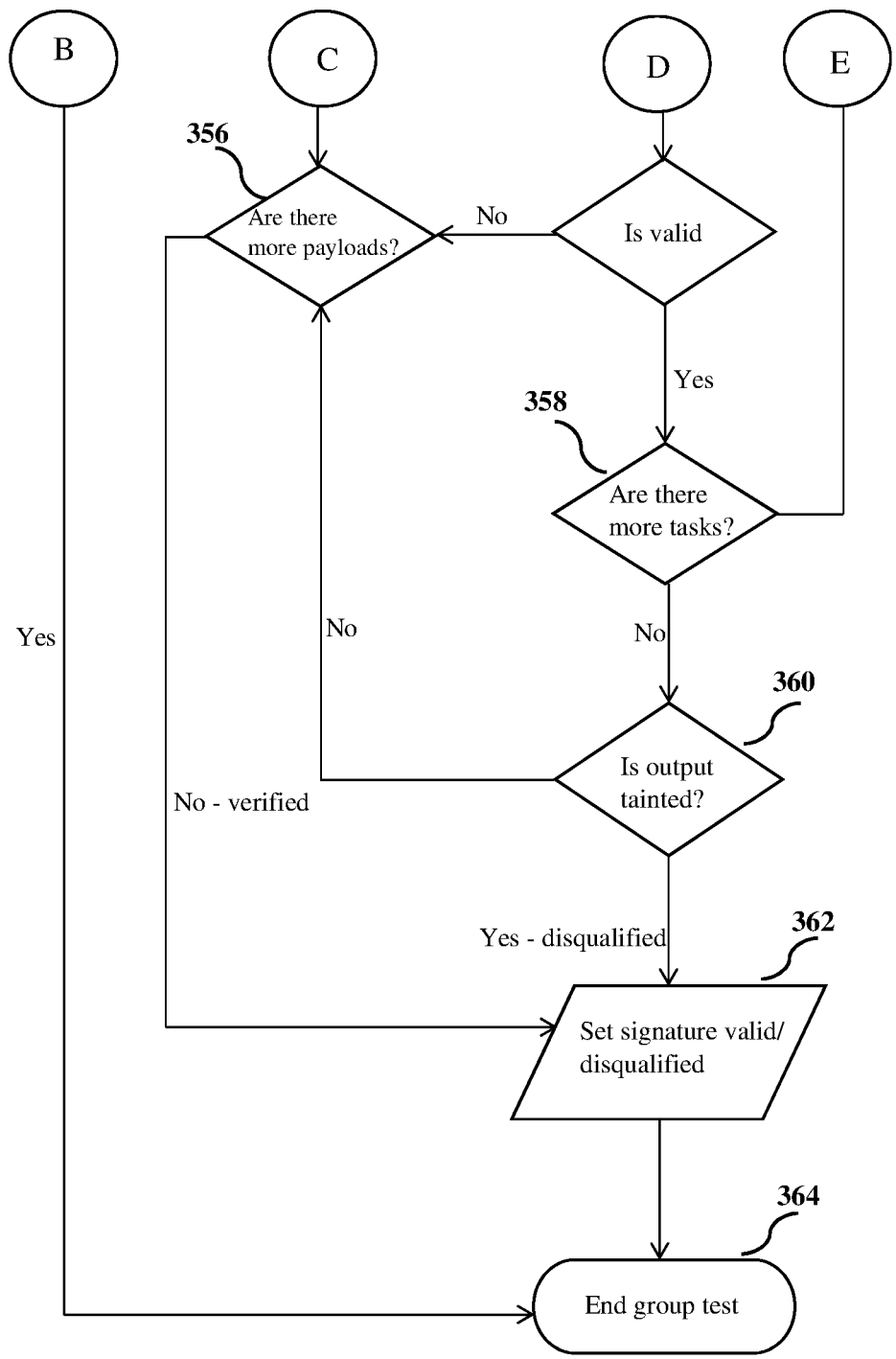

Referring now to FIG. 4B, FIG. 4C and FIG. 4D an example embodiment of the method 300 providing verification of the regex sanitizer is described, in accordance with an embodiment of the present subject matter.

Figure 5A:
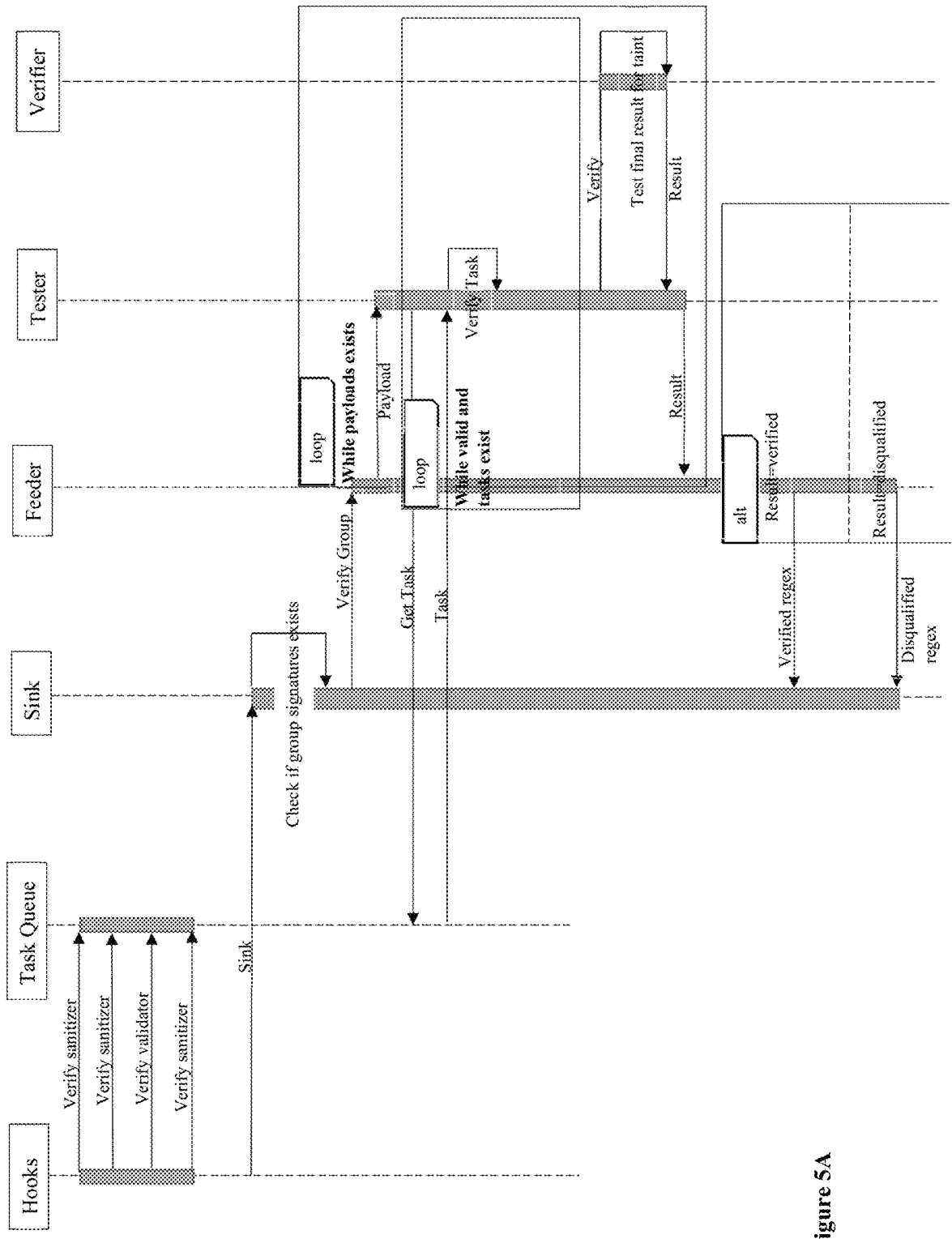
FIG. 5A, illustrates an example embodiment of the verification flow for the method 300 for verifying a regex group, in accordance with an embodiment of the present subject matter.

Referring now to FIG. 5A, an example embodiment illustrating the method to verify a regex group.

Figure 5B:
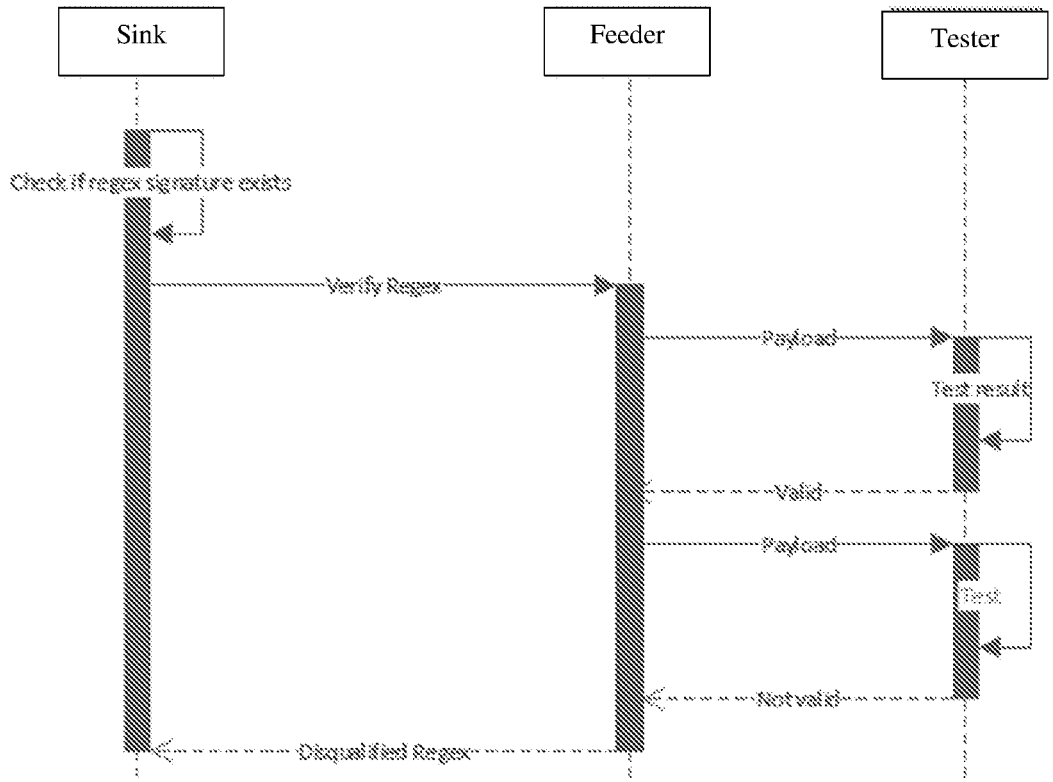
FIG. 5B, illustrates an example embodiment of first instance of a bad sanitizer and validator for the method 300 for verifying a regex group, in accordance with an embodiment of the present subject matter.

Referring now to FIG. 5B, an example embodiment illustrating the first occurrence of each of the bad regex sanitizer or a bad validator is described. When a code is passed from the source to the sink, the system 102 verifies the regex sanitizer and validator. The processor 202 checks, whether a signature associated with the sanitizer and validator exists or not. If in case a signature exists, the regex sanitizer and validator is verified as a valid regex sanitizer and validator. If in case the signature does not match, the processor 202 verifies the regex sanitizer and validator at the feeder level. In the verification, the regex sanitizer and validator is applied over multiple tainted inputs (payloads as shown in figure). The output obtained after applying the regex sanitizer is further checked to determine the output is one of a tainted output or a non-tainted output. The regex sanitizer and validator is qualified as a invalid sanitizer and validator as the output obtained is a tainted output based upon the checking at the tester level and generates the test results. Each of the invalid regex sanitizer is tagged with a validation signature. This validation signature is further used to determine whether the regex sanitizer and validator has been verified as an invalid sanitizer and validator.

Figure 5C:
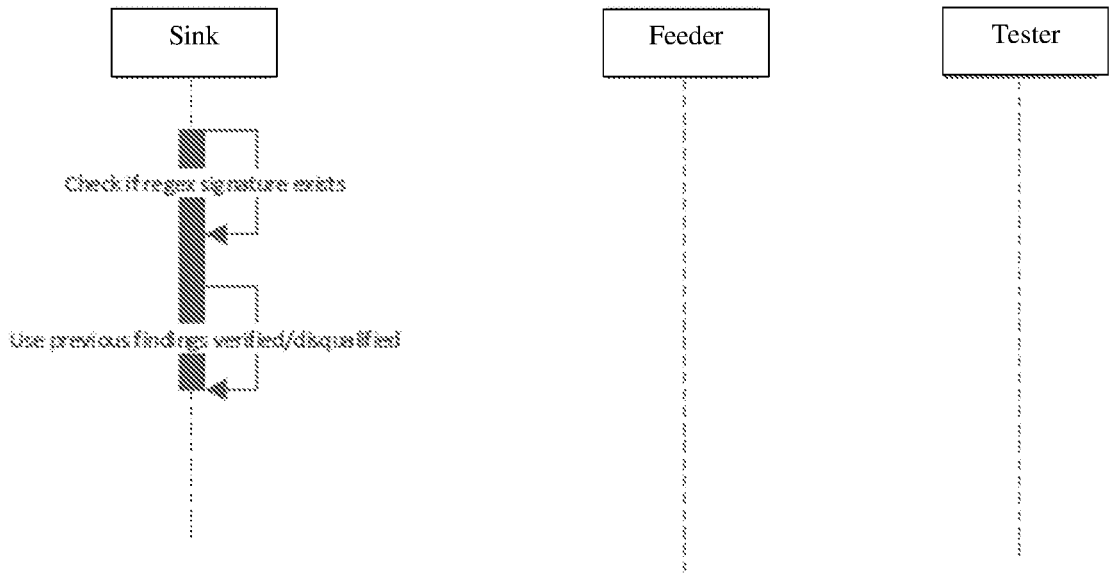
FIG. 5C, illustrates an example embodiment of $N^{th}$ instance of a good or bad sanitizer and validator for the method 300 for verifying a regex group, in accordance with an embodiment of the present subject matter.

Referring now to FIG. 5C, an example embodiment illustrating an $N^{th}$ occurrence of a good or bad sanitizer and validator is described. When a code is passed to the sink, the system 102 verifies the regex sanitizer and validator. The processor 202 checks, whether a signature associated with the sanitizer and validator exists or not. If in case a signature exists, the regex sanitizer and validator is verified as a valid regex sanitizer and validator or an invalid regex sanitizer and validator Although implementations for system and method for verifying a regex sanitizer and validator have been described in language specific to structural features and/or methods, it is to be understood that the appended claims are not necessarily limited to the specific features or methods described. Rather, the specific features and methods are disclosed as examples of implementations for verifying a regex sanitizer and validator.

The invention claimed is:

1. A method of verifying a regex group in an application testing process, the method comprising:
    creating, through a processor, a flow id, for the regex group when source reaches the sink,
    wherein the flow id is used for tracking the flow of the regex group,
    wherein the regex group comprises a plurality of tasks including at least one regex sanitizer and at least one regex validator;
    wherein the flow id comprises a hash of the combination of:
        information from each of the plurality of tasks,
        a vulnerability type corresponding the at least one regex sanitizer and the at least one regex validator and further corresponding to a type of web site injection attack selected from an SQL injection or Cross-site scripting for which the at least one regex sanitizer and the at least one regex validator are configured to mitigate, and
        a regex comprising data input containing tainted characters that may damage the website rendering the website corrupted or gain internal information not intended to be accessed;
    checking, through the processor, in case the flow id is a previously tested flow id;
    passing, through the regex group, each of the plurality of tasks in a queue, wherein the passing is performed when the flow id is not the previously tested flow id;
    wherein the passing comprises:
        passing the regex as a corresponding input into a first of the at least one regex sanitizer,
        wherein the first replaces at least one of the tainted characters with a benign character to create a corresponding output,
        for each of the remaining of the at least one regex sanitizer,
            receiving the corresponding output from a previous regex sanitizer as a corresponding input, and replacing at least another one of the tainted characters with a benign character to create a corresponding output
        wherein the processor checks for each of the at least one regex sanitizer that the corresponding output is different than the corresponding input;
        passing the corresponding output from the last of the at least one regex sanitizer each of the at least one regex validator;
        for each of the at least one regex validator
            perform a validation on the corresponding output;
        wherein if all of the each of the at least one regex validator validates the corresponding output, the regex group is determined to be a valid regex group;
        wherein if any of the each of the at least one regex validator invalidates the corresponding output, the regex group is determined to be an invalid regex group; and
        wherein for any of the at least one regex sanitizer if the corresponding input matches the corresponding output, the regex group is determined to be an invalid regex group;
    wherein when the website receives input data corresponding to an injection attack, the regex group is used to mitigate the injection attack if the regex group was determined to be a valid regex group.

2. The method as claimed in claim 1, wherein the regex sanitizer comprises one of a verified sanitizers or a non-verified sanitizer.

3. The method as claimed in claim 1, wherein the flow id for each of the regex group is stored in a database as the previously tested flow id, after the regex group is qualified as one of the valid regex group or an invalid regex group such the previously tested flow id is used for testing a new flow id based on a mapping of the new flow id with the previously tested flow id.

4. The method as claimed in claim 1, wherein the flow id comprises flow information, wherein the flow information comprises one or more run tasks, wherein the one or more run tasks comprises each of a code run and type of regex used for validating input of a user.

5. The method as claimed in claim 1, wherein the one or more run tasks are associated with predefined tainted input from payload bank, wherein the predefined tainted inputs are passed through the regex group for verifying the validity of the regex group.

6. The method as claimed in claim 1, wherein the passing comprises:
    running, an original regex sanitizer against a user input for verifying the regex sanitizer in the regex group; and
    passing, output of the running to a subsequent task.

7. The method as claimed in claim 1, wherein the passing comprises:
    running, for verifying the regex validator, an original regex sanitizer against a user input for obtaining a Boolean return value;

checking, if the Boolean return value is equal to an original return value; and
continuing, with a subsequent task, in case the Boolean return value is equal to the original return value.

8. The method as claimed in claim 1, wherein the passing comprises:
running, for verifying the regex validator, an original regex sanitizer against a user input for obtaining a Boolean return value;
checking, if the Boolean return value is not equal to an original return value;
pausing, the checking in case the Boolean return value is not equal to the original return value; and
processing, a next user input for the running, wherein the regex validator is considered as a verified regex validator in case the next user input is last user input.

9. The method as claimed in claim 1, comprising:
qualifying, the regex group as the valid regex group in case the flow id is the previously tested flow id.

10. The method as claimed in claim 1, comprising:
disqualifying, the regex group as the valid regex group in case an output obtained after passing is a tainted output.

11. A system of verifying a regex group in an application testing process, the system comprising: a processor; and a memory coupled to the processor, wherein the memory stores a set of instructions to be executed by the processor, wherein the processor is configured to:
create, through a processor, a flow id, for the regex group when source reaches the sink,
wherein the flow id is used for tracking the flow of the regex group,
wherein the regex group comprises a plurality of tasks including at least one regex sanitizer and at least one regex validator;
wherein the flow id comprises a hash of the combination of:
information from each of the plurality of tasks,
a vulnerability type corresponding the at least one regex sanitizer and the at least one regex validator and further corresponding to a type of web site injection attack selected from an SQL injection or Cross-site scripting for which the at least one regex sanitizer and the at least one regex validator are configured to mitigate, and
a regex comprising data input containing tainted characters that may damage the website rendering the website corrupted or gain internal information not intended to be accessed:
check, through the processor, in case the flow id is a previously tested flow id;
pass, through the regex group, each of the plurality of tasks in a queue, wherein the passing is performed when the flow id is not the previously tested flow id:
wherein the passing comprises:
passing the regex as a corresponding input into a first of the at least one regex sanitizer,
wherein the first replaces at least one of the tainted characters with a benign character to create a corresponding output,
for each of the remaining of the at least one regex sanitizer,
receiving the corresponding output from a previous regex sanitizer as a corresponding input, and replacing at least another one of the tainted characters with a benign character to create a corresponding output
wherein the processor checks for each of the at least one regex sanitizer that the corresponding output is different than the corresponding input;
passing the corresponding output from the last of the at least one regex sanitizer each of the at least one regex validator;
for each of the at least one regex validator
perform a validation on the corresponding output;
wherein if all of the each of the at least one regex validator validates the corresponding output, the regex group is determined to be a valid regex group;
wherein if any of the each of the at least one regex validator invalidates the corresponding output, the regex group is determined to be an invalid regex group; and
wherein for any of the at least one regex sanitizer if the corresponding input matches the corresponding output, the regex group is determined to be an invalid regex group;
wherein when the website receives input data corresponding to an injection attack, the regex group is used to mitigate the injection attack if the regex group was determined to be a valid regex group.

12. The system as claimed in claim 11, wherein the regex sanitizer comprises one of a verified sanitizer or a non-verified sanitizer.

13. The system as claimed in claim 11, wherein the flow id for each of the regex group is stored in a database as the previously tested flow id, after the regex group is qualified as one of the valid regex group or an invalid regex group such the previously tested flow id is used for testing a new flow id based on a mapping of the new flow id with the previously tested flow id.

14. The system as claimed in claim 11, wherein the flow id comprises flow information, wherein the flow information comprises one or more run tasks, wherein the one or more run tasks comprises each of a code run and type of regex used for validating input of a user.

15. The system as claimed in claim 11, wherein the one or more run tasks are associated with predefined tainted input from payload bank, wherein the predefined tainted inputs are passed through the regex group for verifying the validity of the regex group.

16. The system as claimed in claim 11, wherein the processor is configured to:
run, an original regex sanitizer against a user input for verifying the regex sanitizer in the regex group; and
pass, output of the running to a subsequent task.

17. The system as claimed in claim 11, wherein the processor is configured to:
run, for verifying the regex validator, an original regex sanitizer against a user input for obtaining a Boolean return value;
check, if the Boolean return value is equal to an original return value; and
continue, with a subsequent task, in case the Boolean return value is equal to the original return value.

18. The system as claimed in claim 1, wherein the processor is further configured to:
run, for verifying the regex validator, an original regex sanitizer against a user input for obtaining a Boolean return value;
check, if the Boolean return value is not equal to an original return value;
pause, the checking in case the Boolean return value is not equal to the original return value; and process, a next user input for the running, wherein the regex validator is considered as a verified regex validator in case the next user input is last user input.

19. The system as claimed in claim 11, wherein the processor is configured to:
qualify, the regex group as the valid regex group in case the flow id is the previously tested flow id.

20. The system as claimed in claim 11, wherein the processor is configured to:
disqualify, the regex group as the valid regex group in case an output obtained after passing is a tainted output.

* * * * *